United States Patent Office 3,572,125
Patented Mar. 23, 1971

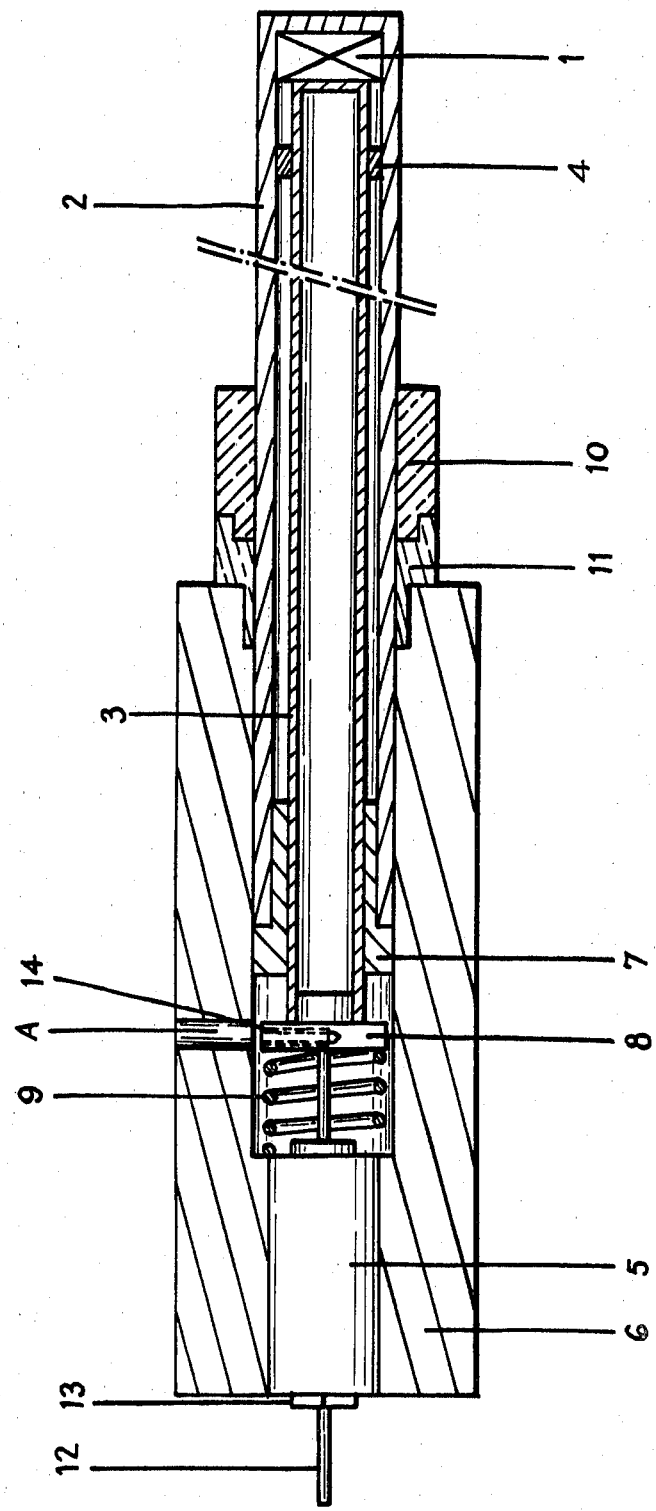

3,572,125
DILATOMETRIC COUPLING DEVICE FOR VERY HIGH TEMPERATURE (3000° C.) REGULATION
Jacques C. Maire, Epinay-sur-Seine, and Jean Pierre M. Slonina, Le Vesinet, France, assignors to Le Carbone Lorraine, Paris, France
Filed Jan. 24, 1969, Ser. No. 793,744
Claims priority, application France, Feb. 9, 1968, 139,215; Dec. 11, 1968, 177,722
Int. Cl. G01k 5/50
U.S. Cl. 73—363                   4 Claims

ABSTRACT OF THE DISCLOSURE

A device for the measurement of high temperatures up to about 3000° C. comprises a stack of graphite pseudomonocrystals about 50 mm. high. The stack is enclosed between an outer fixed cylindrical sheath of vitreous carbon and an inner movable sheath of vitreous carbon, and arranged in an assembly comprising a carbon push rod and a displacement detector so as to detect the expansion of the stack along the c axis only, this expansion being converted into a longitudinal displacement of the inner sheath.

---

The present invention relates to a method of high temperature measurement and devices and more particularly to a dilatometric coupling device for very high temperature (3000° C.) regulation.

It is found that such high temperature measurements cannot be effected by means of tungsten-rhenium or graphite-boron doped graphite, thermocouples, these latter varying in the course of processing or use.

It is a well known fact that, if a crystal is subjected to a rise in temperature, it undergoes deformation. When the variation in temperature $\Delta T$ is small and uniform, the deformation is homogeneous.

By reference to the three main axes of the crystal $Ox_1$, $Ox_2$, $Ox_3$, the following relationships hold:

$$\epsilon_1 = \alpha_1 \Delta T \qquad \epsilon_2 = \alpha_2 \Delta T \qquad \epsilon_3 = \alpha_3 \Delta T$$

$\alpha_1$, $\alpha_2$, $\alpha_3$ denoting the principal coefficients of thermal expansion and $\epsilon_1$, $\epsilon_2$, $\epsilon_3$ the projections of the tensors of deformation on the three main axes.

For the graphite monocrystal and according to the theory developed by Gruneisen and Goens (Z. fur Phys. 1924, 29, 141) the thermal coefficients of expansion $\alpha_a$ and $\alpha_c$ in the directions $a$ and $c$ are expressed in the form:

$$\alpha_a = \frac{1}{a} \frac{(\partial a)}{(\partial T)_P}$$

$$\alpha_a = \frac{1}{c} \frac{(\partial c)}{(\partial t)_P}$$

$a$ and $c$ being the dimensions of the unit cell of the monocrystal, T the absolute temperature and P the pressure. The thermal coefficient of expansion obtained for $\alpha_c$ in particular by Nelson and Riley (Proc. Phys. Soc. 1945, 57, 477) is:

$$\alpha_c = \frac{1}{c} \frac{\partial c}{\partial T} = 27.00 \times 10^{-6} + 3.05 \times 10^{-9} \theta$$

Thus the coefficient $\alpha_c$ is observed to vary as a linear function of the temperature $\theta$.

It is an object of the present invention to provide a method for the accurate measurement of high temperatures.

It is a further object of the invention to provide a device for measuring high temperature which overcomes the drawbacks mentioned above.

Graphite monocrystals are generally of small dimensions and the expansion must be measured by X-rays. Now, by compression of pyrolytic graphite at very high temperature a material, a pseudomonocrystal of graphite, is obtained which has the properties of the monocrystal. In particular, the coefficient of expansion $\alpha_c$ of this pseudomonocrystal in the direction of the compression is even at ambient temperature of the order of $27 \times 10^{-6} /°$ C.

According to the invention there is provided a method for measuring temperature consisting of the measurement of the linear expansion along the axis $c$ of a pseudomonocrystal of graphite.

According to another aspect of the invention there is provided a dilatometric couple for high temperature measurement comprising a pseudomonocrystal of graphite.

In order that the invention may be more clearly understood several embodiments thereof are described below purely by way of non-limiting examples, with reference to the accompanying drawing in which the single figure shows diagramatically in longitudinal cross-section one embodiment of an apparatus according to the invention. A plurality of these pseudomonocrystals may be superposed to obtain a stack approximately 50 mm. in height. If this stack is subjected to a rise in temperature, its height will increase by approximately 1.35 microns per degree centigrade and consequently 1.35 mm. for a temperature difference of 1000 C. Standardisation curves may be prepared to enable the variation of $\alpha_c$ as a function of temperature to be determined experimentally.

The elongation of the pseudomonocrystal may be measured by means of any expansion measuring device.

In particular, a differential system using a sheath and a push-rod constituted either by polycrystalline graphite of the same expansion or vitreous carbon which has been processed or treated at high temperature, may be used, this latter material having the property of remaining relatively impermeable at high temperature.

Thus, the virtually linear elongation is not affected by impurities and its measurement enables the corresponding temperature to be deduced. In this way, it is possible to measure temperature with a fair degree of accuracy up to 3,000° C. by operating at a low pressure in order to avoid the graphite flowing.

The apparatus, represented diagramatically in the figure, comprises three parts: a sheath-push rod system, a measuring member, and a recording device.

The outer sheath 2 and the inner sheath 3 are of vitreous carbon treated at 2500° C. and provided from the same production batch. The bottom of the sheath 2 and the end of the sheath 3 are ground and exactly perpendicular to the axis so as to be applied in exact manner on the plane faces of the graphite pseudomonocrystal 1. A guide ring 4 of purified polycrystalline graphite, with fine grains, enables the outer sheath to be centered opposite the inner sheath.

The measuring head is constituted by a displacement detector with a differential linear transformer possessing an incorporated oscillator and demodulator and by a mechanical adaptation constituted by an amagnetic sheath 6 comprising three bores, by a guide ring 7 rigidly attached to the outer fixed sheath, by a push rod 8 rigidly fixed to the inner movable sheath, by a steel spring 9, by a fixing device 10 and by a stuffing box 11.

An impedance adapter enables connection to be made to any type of recorder.

Operation is carried out in the following manner: the displacement detector 5 is centered in the sheath 6 and remains longitudinally fixed by two externally accessible screws, the spring 9 is introduced into the sheath 6, the assembly slides on the guide ring 7, the stuffing box 11 is fixed on the sheath 6, the spring 9 is compressed until the push rod 8 appears in the aperture (A) created for this purpose, the sheath 6 and the outer sheath 2 are rigidly fixed together with the interposition of the stuffing box 11; it then suffices to adjust the mechanical zero of the recorder. The recorder is connected by a multi-pin connector 13 at the rear of the detector 5. After connection, the electrical zero is displaced. The core 12 of the detector 5 is made to vary manually so that the recorder indicates zero. The magnetic core and the push-rod 8 are then rigdly fixed together by the point screw 14. The apparatus is then ready for use.

The device described hereinabove thus enables temperature to be measured accurately. It may also be used to control a temperature-level: The elongations and contractions measured about a mean position detect rises and falls in temperature.

The expansion or contraction of the pseudomonocrystal may be measured by any known means.

It will be understood that various changes and modifications may be made in the embodiments of the method and the device according to the invention described above, without departing from the essential concept of the invention as defined in scope by the appended claims.

We claim:

1. A device for the measurement of high temperature comprising a pseudomonocrystal of graphite and means for its dimensional measurement along the $c$ axis only.

2. A device according to claim 1, comprising a stack of graphite pseudomonocrystals.

3. A device according to claim 2, wherein said stack is about 50 mm. in height.

4. A device according to claim 2 comprising an outer fixed cylinderical carbon sheath, an inner movable cylindrical carbon sheath co-axially arranged within said outer sheath, the stack of graphite pseudomonocrystals being located within said outer sheath at one end thereof between said end and an adjacent end of said inner sheath, a carbon push rod rigid with the end of said inner sheath remote from said stack, and a displacement detector adapted to detect displacement of said push rod.

References Cited

UNITED STATES PATENTS

| | | | |
|---|---|---|---|
| 1,217,601 | 2/1917 | Householder | 73—362.3X |
| 1,652,143 | 12/1927 | Hart | 73—363X |
| 2,246,536 | 6/1941 | Reinthaler | 73—363 |
| 3,038,337 | 6/1962 | Diefendorf | 73—363 |

FOREIGN PATENTS

| | | | |
|---|---|---|---|
| 683,504 | 3/1964 | Canada | 73—363 |

LOUIS R. PRINCE, Primary Examiner

W. A. HENRY II, Assistant Examiner